No. 764,480. PATENTED JULY 5, 1904.
J. B. LINN.
MOTOR CONTROL SYSTEM.
APPLICATION FILED NOV. 11, 1901.
NO MODEL. 3 SHEETS—SHEET 2.
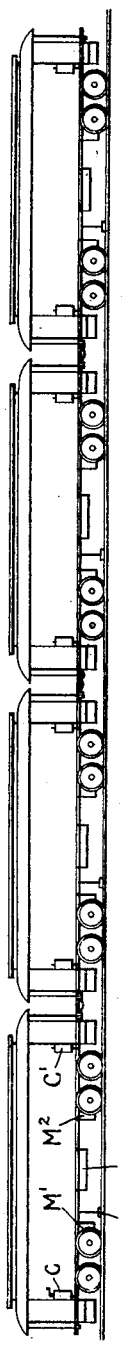
Fig.2
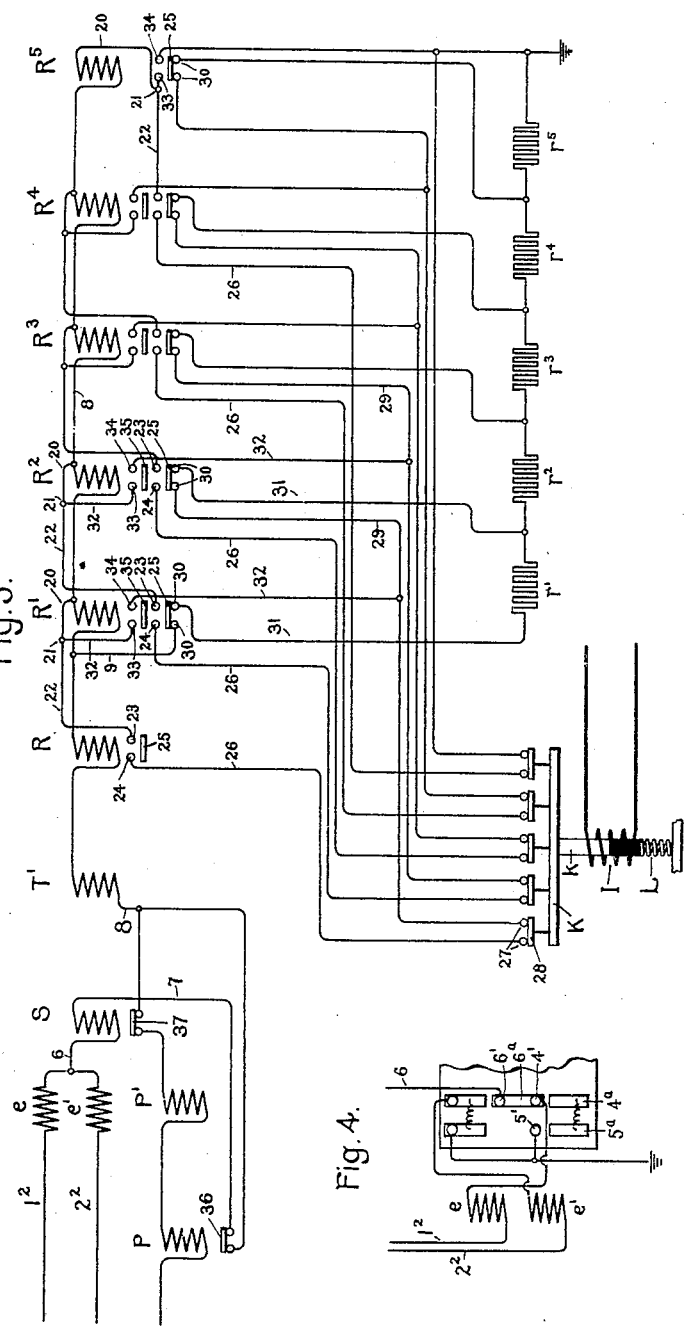
Fig.3
Fig.4
Witnesses.
J. Ellis Glenn.
Benjamin R. Hull.
Inventor.
John B. Linn.
by Albert G. Davis
Atty.

No. 764,480. PATENTED JULY 5, 1904.
J. B. LINN.
MOTOR CONTROL SYSTEM.
APPLICATION FILED NOV. 11, 1901.
NO MODEL. 3 SHEETS—SHEET 3.

Witnesses
J. Ellis Glenn.
Benjamin B. Hull.

Inventor:
John B. Linn.
by Albert G. Davis
Atty.

No. 764,480.

Patented July 5, 1904.

UNITED STATES PATENT OFFICE.

JOHN B. LINN, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 764,480, dated July 5, 1904.

Application filed November 11, 1901. Serial No. 81,843. (No model.)

*To all whom it may concern:*

Be it known that I, JOHN B. LINN, a citizen of the United States, residing at Schenectady, county of Schenectady, State of New York, have invented certain new and useful Improvements in Motor-Control Systems, of which the following is a specification.

The present invention relates to a system of control employing a controller of the separately-actuated contact type in which the several controller-contacts are arranged to be operated at a rate dependent upon the value of the current in the motor-circuit by means of connections so arranged that the system will be automatic or at least partially automatic in its operation.

The invention consists of a novel system of connections for operating a controller of the character above specified.

In a companion case, filed November 11, 1901, Serial No. 81,842, I have disclosed a system of the same general character as the one constituting the subject-matter of the present application; but in that case the system is provided with means for causing the resistance-controlling switches to operate one after another at predetermined intervals of time. In that case I have made claims covering such features of the system as are common to the two cases.

My present invention will be understood by reference to the following description, taken in connection with the accompanying drawings, and its scope will be pointed out in the appended claims.

Figure 1:
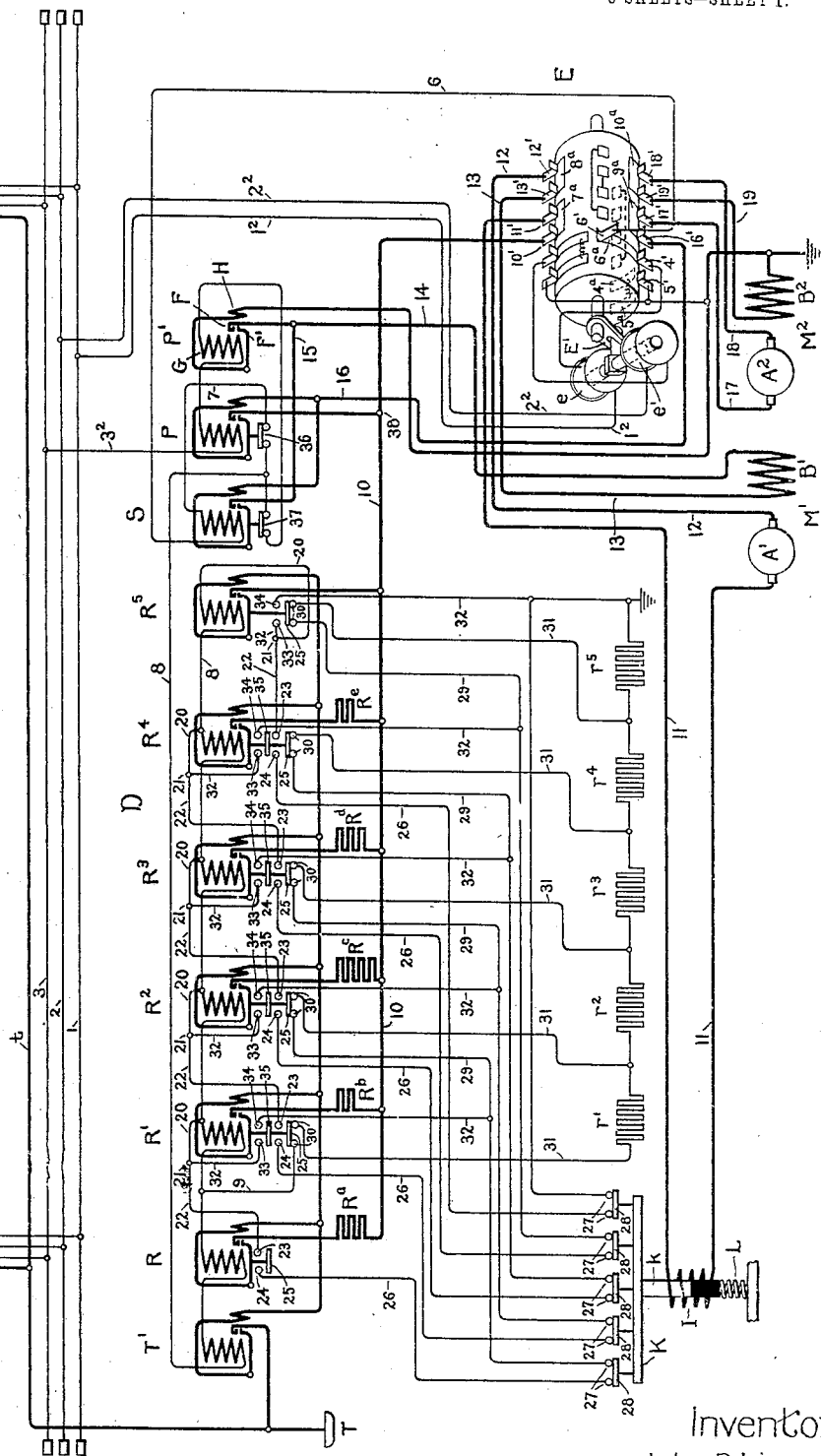
Figure 5:
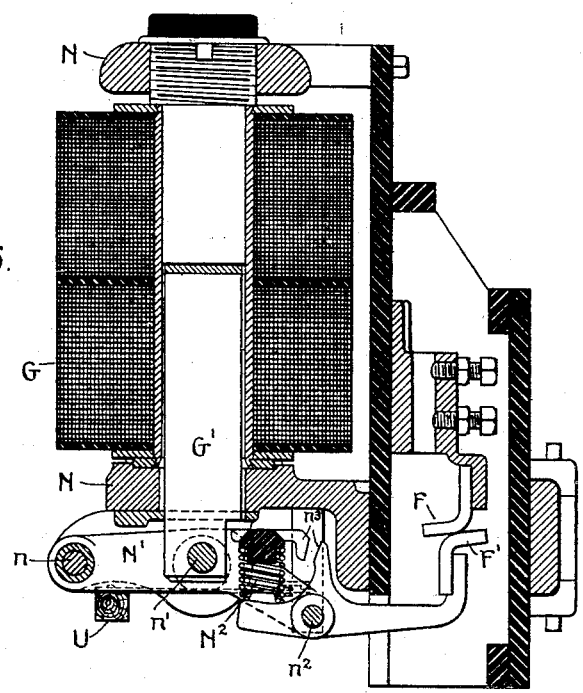
Figure 6:
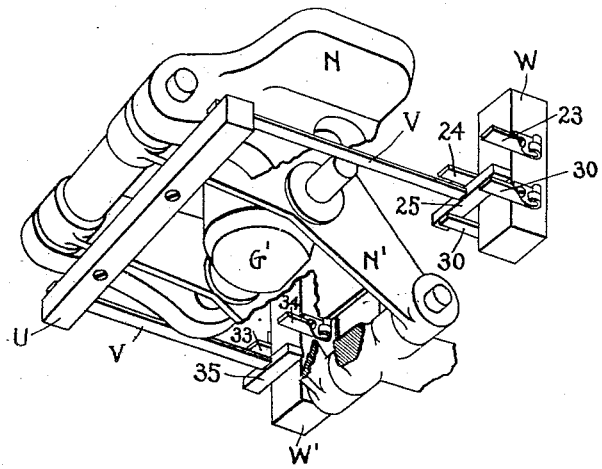

In the accompanying drawings, Figure 1 is a diagram of the control and power circuits of one motor-car of a train equipped with my improved system. Fig. 2 is a side elevation of a train of four motor-cars so equipped. Fig. 3 is a diagram of the circuit connections of the actuating-coils of the controller elements. Fig. 4 is a diagram of a portion of the reversing-switch. Fig. 5 is a longitudinal section of one of the controller elements. Fig. 6 is a perspective view of the lower side thereof.

Referring first to Fig. 1, M' and M² indicate the motors constituting the motor-equipment of an electrically-operated car, A'-A² being the armatures and B'-B² the field-magnets. At T is a trolley, such as a sliding contact-shoe, connected by a wire $t$ with two master-controllers, (represented diagrammatically at C-C'.) At D is a controller comprising a plurality of electromagnetic switches for regulating the speed of the motors. The direction of rotation is governed by a reversing-switch E. Three wires 1-2-3 extend from one end of the car to the other, each wire being provided at its ends with suitable coupling devices, by which it may be connected with a similar wire on the next adjacent car of the train. These wires are connected both to the actuating-circuits of the electromagnets which operate the motor-controller contacts and also to the master-controller contacts, so that by the operation of any master-controller on the train all the motor-controllers on the several motor-cars will be simultaneously operated.

In Fig. 1 the wires which convey the trolley-current are shown by heavy lines, while the control-circuits are indicated by lighter lines.

The preferred construction for each of the elements of the controller D is shown in Figs. 5 and 6, from which it appears that each element comprises fixed and movable contacts F-F' and a solenoid G for actuating the movable contact. These elements are diagrammatically indicated in Fig. 1, together with a blow-out coil H to extinguish any arc which may be formed at the contacts.

The order of circuit changes in the usual series-parallel motor-controller is well known, consisting in first connecting the motors in series through a current-reducing resistance, which is then gradually cut out, then placing the motors in parallel with each other and in series with the resistance, which is again gradually cut out until the motors are running in multiple under full-line current. The electromagnetic switches in my system therefore divide themselves into four sets—one (lettered T') serving as a main circuit-closer, another (lettered S) to connect the motors in series, two others (lettered P-P') to connect them in multiple, and the fourth set (lettered R-R⁵) to control the resistance in circuit with the motors. The switches in this last set operate in succession and automatically. To prevent them from following one another too rapidly their operation is controlled by a current-limiting device, and to prevent them from being affected by the current-limiting device after they have once been operated, each switch is provided with auxiliary contacts for closing a shunt-circuit around the contacts of the current-limiting device.

Taking up now the operation of the system in detail, it will be observed at the outset that the master-controller has four fingers, $t'$-1'-2'-3', each connected, respectively, with the wires $t$-1-2-3. The contact-segments (shown in development) are arranged in four positions—two for forward movement and two for reverse. Segments $t^a$-$1^a$ are looped together and effect a connection of the motors in series for forward rotation. Segments $t^b$-$3^b$ are looped together and effect a connection of the motors in parallel for forward rotation. Segments $t^c$-$2^c$ are looped together and connect the motors in series for backward rotation. Segments $t^d$-$3^d$ connect the motors in parallel for backward rotation. Suppose the master-controller to be moved to the first position FS, with the segments $t^a$-$1^a$ in contact with their respective fingers. Current will then flow from the trolley T to finger $t'$, segments $t^a$-$1^a$, finger 1', and wires 1-$1^2$ to a solenoid $e$, whose movable core is connected with a crank-arm E' on the shaft of the reversing-switch cylinder E. The circuit is completed through a finger 4', resting on a segment $4^a$ on said cylinder, a connected segment $5^a$, and a grounded finger 5'. The oscillation of the cylinder by the solenoid $e$ carries the segments $4^a$-$5^a$ away from the fingers 4'-5' and brings the former in contact with a segment $6^a$, which is permanently in contact with a finger 6', connected by a wire 6 with the solenoid of the electromagnetic switch S. From this the circuit is by wires 7 and 8 to the switches T' and R and thence by wire 9 to the resistances $r'$-$r^2$-$r^3$-$r^4$-$r^5$ and ground. The switch T' closes the power-circuit, and the switch R sends the current through the resistance $R^a$ to the wire 10, by which it is conducted to the fingers 10'-11', connected by segment $7^a$ on the cylinder E of the reversing-switch. Finger 11' is connected by wire 11 with a solenoid I and one brush of the motor M'. The other brush is connected by a wire 12 with a finger 12' in contact with a segment $8^a$ on the cylinder E, by means of which the current is conveyed to a finger 13', connected by wire 13 with one terminal of the field-coil B' of the motor M'. The circuit is thence by wires 14 and 15 to the closed switch S, wire 16, finger 16', segment $9^a$, finger 17', wire 17, armature $A^2$, wire 18, finger 18', segment $10^a$, finger 19', wire 19, and field-coil $B^2$ to ground. It will be seen that the two motors are in series with the resistance $R^a$ in the circuit.

The motor-circuits having been traced, I will now return to the description of the control system and will explain how the speed-controlling contacts are caused to operate in succession and how the successive operation of the said contacts is automatically controlled in accordance with the flow of current in the motor-circuits. The actuating-windings of the electromagnetically-actuated switches or contactors R-R⁵ are connected in series, and intermediate circuit connections are led off from between each two adjacent windings. Each of these intermediate connections except the first leads through conductors 20 and 22 to one of two contacts 23 and 24, which are arranged to be bridged by a contact 25, attached to the armature of the next preceding switch in the series. Each contact 24 is connected through a pair of contacts 27 with a conductor 29, which leads through a compensating resistance to one side of the supply-circuit. This connection is shown direct to ground, though it might as well be and in practice often would be led back through contacts on the master-controller before reaching ground. In the particular arrangement shown in the drawings the compensating resistance comprises a number of resistance-sections connected in series, and at the time when the actuating-circuit through an advance winding is first completed the said winding is connected in shunt to a section of the compensating resistance; but by means of a pair of contacts 30, included in circuit with the conductor 29, the actuating-circuit through each intermediate circuit connection is opened as soon as the circuit has been closed through the intermediate circuit connection next in advance. The pair of contacts 30 are normally connected by a bridging contact 25, controlled by one of the switches in advance of the one which is being operated.

From the description just given it will be seen that each intermediate circuit connection leads through one of the sets of contacts 27, so that whenever the current in the motor-circuits rises above a predetermined limit each of these circuits will be open at the contacts 27-28 and the resistance-switches will be prevented from operating until the current falls below the said limit. In order to prevent the opening of the resistance-switches which have already been operated, each of the switches, except the first in the series, is provided with an additional set of contacts 33-34, arranged to be closed by the bridging contact 35 whenever the switch is in its closed position. Those contacts close a shunt-circuit from point 21 through conductor 32 around the contacts 27, so that after a switch has once been closed the opening and closing of the circuits at contacts 27-28 will have no effect upon it. The remaining switches, however, cannot be operated so long as the contacts 27-28 are open-circuited.

The contacts 23, 24, 30, 33, and 34, together with the coöperating movable contacts 25 and 35, I have termed "auxiliary" contacts in order to distinguish them from the main switches or contacts in the motor-circuit.

The conductor 9 and each of the conductors 29 are connected through contacts 30 on a switch in advance of the one being actuated to compensating resistances and thence to ground, and these resistances are preferably graduated, so that the current in the actuating-circuit will be maintained substantially constant irrespective of the number of actuating-windings connected in circuit. In the arrangement which I have shown in the drawings all of these resistances $r$-$r^5$ are connected in series in a single circuit, and the conductors 31, leading from the contacts 30, are connected to the end and the intermediate points of this series of resistances.

The first of the intermediate circuit connections leads from between the actuating-windings of the contactors R and R' through conductor 9, contacts 30, and conductors 31 direct to the end of the resistance $r'$, and this circuit therefore includes all of the resistance-sections $r'$-$r^5$. The second intermediate circuit connection leads from a point between contactors R' and R² through conductors 20 and 21, contacts 23 and 24, controlled by contactor R, conductor 26, contacts 27, controlled by the current in the motor-circuit, conductor 29, contacts 30, controlled by contactor R², and conductor 31 to a point between the resistances $r'$ and $r^2$, the succeeding circuits being similarly traced. Each time the actuating-circuit is extended to include another actuating-winding it is closed through a lesser number of the resistance-sections until when the circuit is closed through the entire series the compensating resistance is entirely out of the circuit.

The bridging contacts 28, which operate to close the circuits through contacts 27, are all mounted on a movable carrier K, which has a stem $k$, forming a core for the solenoid I. A spring L keeps the contacts 28 normally in their closed positions; but an abnormal current in the solenoid I, which is included in the motor-circuit, will draw down the carrrier and open all the circuits simultaneously.

When no current is flowing, the system stands as shown in Fig. 1, the coil R being connected through the wire 9, contacts 30-25, wire 31, and the resistance-coils $r'$-$r^5$ to ground.

When the coil R is energized, it picks up its contact 25, closing the circuit through wires 22-26, the first contact 28, wire 29, the first set of contacts 30-25, (at switch R²,) and wire 31, thus cutting out the first resistance-coil $r'$ and permitting current to flow through switch-coil R'. This picks up its contacts 25-35, open-circuiting the wire 9 and closing the two branch circuits through 22 and 32. The latter shunts the first contact 28 and the former establishes a circuit for the switch-coil R² through the second contact 28 and the contacts 30 of the switch R³, so as to cut out the resistance-coil $r^2$. In order to maintain the resistance of the control-circuit constant, the resistance of each coil $r'$-$r^5$ is equal to that of a coil R'-R⁵, so that as successive switch-coils R'-R⁵ are cut in the coils $r'$-$r^5$ are correspondingly cut out. This operation of cutting in successively the actuating-windings of the switches R' R⁵ and cutting out the resistances $r'$-$r^5$ (and at the same time the power-circuit resistances $R^a$-$R^e$) would take place very rapidly if no means of checking it were supplied; but, as previously pointed out, if the motor-current becomes too heavy the solenoid I will open the contacts 28, thus preventing the current in the control-circuit from flowing through the next switch-actuating winding until the motors have speeded up sufficiently for their counter electromotive force to cut down the trolley-current and weaken the solenoid I to such an extent that the spring L will close the contacts 28 again. This opening and closing of the contacts 28 will not disturb the switch-circuits already established, since they are maintained through the branches 32, which shunt the contacts 28. It thus appears that the coils of the switches R'-R⁵ will be successively energized at a rate determined by the speed of the motor.

When the motors are to be connected in parallel, the master-controller is moved to the second position, (lettered FP,) sending current through the wires 3-3² and energizing the coils P-P', the reversing-switch E remaining in the position to which it was moved when the solenoid $e$ was first energized. It will be noticed that the switch P carries a bridging contact 36, which opens the circuit of the series switch S; vice versa, the switch S controls the circuit of the parallel switch P by means of a bridging contact 37. This arrangement prevents the simultaneous operation of both switches. The switches P-P' being closed and the switch S open, the trolley-current coming through the wire 10 divides at 38 and goes through the two motors M'-M² in multiple, the ground connection for motor M' being closed by the switch P'.

To stop the car, the master-controller is turned to the off position, deënergizing all the switches and opening the control and power circuits.

If the car or train is to run in the opposite direction, the master-controller is turned to the RS position, energizing the solenoid $e'$ and causing the reversing-switch E to oscillate to its other position, in which the fingers rest on a different set of contacts arranged to send the trolley-current in the reverse direction through the armatures A'-A² in series. The circuits are otherwise the same. The RP position of the master-controller puts the motors in parallel for backward rotation.

On Sheet 3 of the drawings is shown one of the electromagnetic switches. The solenoid G is supported in a frame N, to which is pivoted at $n$ the switch-arm N', pivotally connected at $n'$ with the core G'. The switch-arm is made in two parts hinged together at $n^2$ and held in yielding relation to each other by a spring N². Stop-lugs $n^3$ limit the movement of the two parts. The effect of this construction is to give a quicker make and break at the contacts F-F', as set forth in the application of Frank E. Case, Serial No. 62,910, filed June 3, 1901. I add to this switch a cross-bar U, to which are secured two arms V, preferably somewhat resilient and carrying at their ends the bridging contacts 25-35, respectively. On a suitable support W adjacent to the contact 25 are mounted the pairs of contacts 23, 24, and 30. On another support, W', adjacent to the contact 35 is mounted the pair of contacts 33 34. When the solenoid attracts its core G', the contacts F F' are closed, the contact 25 is lifted from the contacts 30 and closed upon 23-24, and the contact 35 is closed upon 33-34.

While I have illustrated and described my invention as applied to an electrically-operated control system, it will be understood that it presents features which are applicable to systems of control operated by other than electrical means.

What I claim as new, and desire to secure by Letters Patent of the United States, is—

1. The combination with a plurality of separate electromagnetically-actuated switches having their actuating-windings connected in series, of circuit connections intermediate the said windings, or certain of them, leading to one side of the supply-circuit, and contacts controlled in their operation by the current in the motor-circuit included in said intermediate circuit connections.

2. The combination with a plurality of separate electromagnetically-actuated switches having their actuating-windings connected in series, of circuit connections intermediate the said windings, or certain of them, leading to one side of the supply-circuit, contacts controlled in their operation by the current in the motor-circuit included in said intermediate circuit connections, and shunt-circuits around the latter contacts controlled by the separate switches.

3. The combination with a series of separate electromagnetically-actuated switches having their actuating-windings connected in series, of circuit connections intermediate the said windings, or certain of them, all except the first leading through contacts controlled by a preceding switch in the series, and contacts controlled in their operation by the current in the motor-circuit also included in said intermediate circuit connections.

4. The combination with a series of separate electromagnetically-actuated switches having their windings connected in series, of a circuit for supplying current to one or more of said windings, auxiliary contacts operatively related to each of certain switches normally closing the said circuit through the actuating-winding of a preceding switch in series with a compensating resistance, other auxiliary contacts operatively related to each of the said switches for closing a circuit through the actuating-winding of an advance contact in shunt to a section of said compensating resistance, contacts controlled by the motor-current included in said shunt-circuit, and means for shunting the latter contacts as each switch is operated.

5. The combination with a plurality of separate electromagnetically-actuated switches having their actuating-windings connected in series, of circuit connections intermediate the said windings, or certain of them, leading through compensating resistances to one side of the supply-circuit, contacts controlled in their operation by the current in the motor-circuit included in said intermediate connections, shunt-circuits around the latter contacts controlled by the separate switches, contacts operated by each switch for closing a circuit through the actuating-winding of an advance switch, and other contacts controlled by the several switches arranged to open the circuit through the actuating-winding of a preceding switch after a circuit has been completed through the actuating-winding of the advance switch.

6. The combination with a motor-controller of the separately-actuated contact type, of an actuating-circuit for each of certain contacts controlled by an adjacent contact, a switch in said circuit controlled by the motor speed, and a shunt around said switch forming part of the actuating-circuit and controlled by the contact itself.

7. The combination with a motor-controller of the separately-actuated contact type, of an actuating-circuit for each of certain contacts controlled by the adjacent contacts on each side, and a switch in said circuit controlled by a solenoid in the motor-circuit.

8. The combination with a motor-controller of the separately-actuated contact type, of an actuating-circuit for certain resistance-controlling contacts controlled by the adjacent contacts on each side, a switch in said circuit controlled by a solenoid in the motor-circuit, and a shunt-circuit controlled by the contact itself.

9. The combination with a motor-controller of the separately-actuated contact type, actuating means for the contacts, connections to each of certain of said actuating means controlled by the adjacent contacts on either side, and a current-limiting device controlled by the current in the motor-circuit for controlling the said connections to prevent a too rapid successive operation of the contacts.

10. The combination with a motor-controller of the separately-actuated contact type, contact-actuating means, connections to each of certain of said actuating means controlled by the adjacent contacts on either side, a current-limiting device controlled by the current in the motor-circuit for controlling said connections to prevent a too rapid successive operation of the contacts, and means controlled by the contact itself for preventing the contact from being affected by the operation of said current-limiting device.

In witness whereof I have hereunto set my hand this 8th day of November, 1901.

JOHN B. LINN.

Witnesses:
   BENJAMIN B. HULL,
   HELEN ORFORD.